United States Patent
Kim et al.

(10) Patent No.: US 12,173,092 B2
(45) Date of Patent: *Dec. 24, 2024

(54) CARBOXYLIC ACID MODIFIED-NITRILE BASED COPOLYMER LATEX

(71) Applicant: LG Chem, Ltd., Seoul (KR)

(72) Inventors: Jung Eun Kim, Daejeon (KR); Won Sang Kwon, Daejeon (KR); Ji Hyun Kim, Daejeon (KR); Sang Jin Shin, Daejeon (KR); Do Young Ha, Daejeon (KR)

(73) Assignee: LG Chem, Ltd., Seoul (KR)

(*) Notice: Subject to any disclaimer, the term of this patent is extended or adjusted under 35 U.S.C. 154(b) by 603 days.

This patent is subject to a terminal disclaimer.

(21) Appl. No.: 17/600,861

(22) PCT Filed: Feb. 8, 2021

(86) PCT No.: PCT/KR2021/001621
§ 371 (c)(1),
(2) Date: Oct. 1, 2021

(87) PCT Pub. No.: WO2021/201415
PCT Pub. Date: Oct. 7, 2021

(65) Prior Publication Data
US 2022/0227900 A1  Jul. 21, 2022

(30) Foreign Application Priority Data

Mar. 31, 2020 (KR) .................. 10-2020-0039060
Mar. 31, 2020 (KR) .................. 10-2020-0039065
(Continued)

(51) Int. Cl.
*C08F 136/06* (2006.01)
*C08L 9/04* (2006.01)

(52) U.S. Cl.
CPC .............. *C08F 136/06* (2013.01); *C08L 9/04* (2013.01); *C08L 2201/52* (2013.01)

(58) Field of Classification Search
CPC ....... C08F 136/06; C08L 2201/52; C08L 9/04
(Continued)

(56) References Cited

U.S. PATENT DOCUMENTS 6,380,303 B1  4/2002  Ogoe et al.
11,834,573 B2 * 12/2023 Galizio ................... C08L 9/06
(Continued)

FOREIGN PATENT DOCUMENTS

CN  1656166 A  8/2005
CN  1696164 A  11/2005
(Continued)

OTHER PUBLICATIONS

Translation of JP 2007-177091, Jul. 12, 2007. (Year: 2007).*
(Continued)

*Primary Examiner* — Robert D Harlan
(74) *Attorney, Agent, or Firm* — Lerner David LLP

(57) ABSTRACT

The present technology provides a carboxylic acid-modified nitrile-based copolymer latex including a carboxylic acid-modified nitrile-based copolymer including a conjugated diene-based monomer-derived unit, an ethylenic unsaturated nitrile-based monomer-derived unit, and an ethylenic unsaturated acid monomer-derived unit, wherein a pKa is 9.5 to 10.2, and the carboxylic acid-modified nitrile-based copolymer latex satisfies General Formulas 1 and 2.

10 Claims, 2 Drawing Sheets

(30) Foreign Application Priority Data

| | | | |
|---|---|---|---|
| Mar. 31, 2020 | (KR) | ........................ | 10-2020-0039067 |
| Mar. 31, 2020 | (KR) | ........................ | 10-2020-0039071 |
| Mar. 31, 2020 | (KR) | ........................ | 10-2020-0039074 |
| Mar. 31, 2020 | (KR) | ........................ | 10-2020-0039076 |
| Dec. 11, 2020 | (KR) | ........................ | 10-2020-0173051 |

(58) Field of Classification Search
USPC ........................................................ 526/318.6
See application file for complete search history.

(56) References Cited

U.S. PATENT DOCUMENTS

| | | | |
|---|---|---|---|
| 11,873,391 B2* | 1/2024 | Ha | ........................... C08C 19/04 |
| 2005/0171272 A1 | 8/2005 | Ota et al. | |
| 2006/0148992 A1 | 7/2006 | Kim et al. | |
| 2011/0213073 A1 | 9/2011 | Weitzel et al. | |
| 2016/0244575 A1 | 8/2016 | Kim et al. | |
| 2016/0289396 A1 | 10/2016 | Patel et al. | |
| 2017/0283599 A1 | 10/2017 | Cha et al. | |
| 2017/0327669 A1 | 11/2017 | Ng et al. | |
| 2018/0362750 A1 | 12/2018 | Lee et al. | |
| 2019/0071530 A1* | 3/2019 | Igari | ..................... C08F 236/14 |
| 2019/0127507 A1 | 5/2019 | Joe et al. | |
| 2019/0161601 A1 | 5/2019 | Enomoto et al. | |
| 2020/0040118 A1 | 2/2020 | Kim et al. | |
| 2020/0062879 A1 | 2/2020 | Simpson et al. | |
| 2020/0317893 A1 | 10/2020 | Kim et al. | |
| 2022/0185999 A1 | 6/2022 | Oh et al. | |
| 2022/0195151 A1 | 6/2022 | Han et al. | |
| 2022/0204732 A1 | 6/2022 | Ha et al. | |
| 2022/0227900 A1 | 7/2022 | Kim et al. | |
| 2022/0227910 A1 | 7/2022 | Lee et al. | |

FOREIGN PATENT DOCUMENTS

| | | |
|---|---|---|
| CN | 101747542 A | 6/2010 |
| CN | 107636032 A | 1/2018 |
| CN | 108368189 A | 8/2018 |
| CN | 108779217 A | 11/2018 |
| CN | 110072936 A | 7/2019 |
| CN | 110198964 A | 9/2019 |
| EP | 0277687 A2 | 8/1988 |
| EP | 1215236 A2 | 6/2002 |
| EP | 1478672 A1 | 11/2004 |
| EP | 1148068 B1 | 5/2006 |
| EP | 2891668 A1 | 7/2015 |
| EP | 3412717 A1 | 12/2018 |
| EP | 3412718 A1 | 12/2018 |
| EP | 3421532 A1 | 1/2019 |
| EP | 3438145 A1 | 2/2019 |
| EP | 3486280 A1 | 5/2019 |
| EP | 3556785 A1 | 10/2019 |
| JP | H08319303 A | 12/1996 |
| JP | H1112328 A | 1/1999 |
| JP | H1192595 A | 4/1999 |
| JP | 2003-165814 A | 6/2003 |
| JP | 2003165870 A | 6/2003 |
| JP | 2003252935 A | 9/2003 |
| JP | 2003277523 A | 10/2003 |
| JP | 2003342303 A | 12/2003 |
| JP | 2005-336273 A | 12/2005 |
| JP | 2007031574 A | 2/2007 |
| JP | 3915489 B2 | 5/2007 |
| JP | 2007161925 A | 6/2007 |
| JP | 2007177091 | * 7/2007 |
| JP | 2007177091 A | * 7/2007 |
| JP | 4100740 B2 | 6/2008 |
| JP | 2014-088536 A | 5/2014 |
| JP | 5487541 B2 | 5/2014 |
| JP | 201488536 A | 5/2014 |
| JP | 5719388 B2 | 5/2015 |
| JP | 2016538393 A | 12/2016 |
| JP | 2017149949 A | 8/2017 |
| JP | 2019529602 A | 10/2019 |
| JP | 2020505492 A | 2/2020 |
| JP | 2022530161 A | 6/2022 |
| JP | 2022530214 A | 6/2022 |
| JP | 2022530306 A | 6/2022 |
| JP | 2022530507 A | 6/2022 |
| JP | 2022531537 A | 7/2022 |
| KR | 960000567 B1 | 1/1996 |
| KR | 20040105464 A | 12/2004 |
| KR | 100680328 B1 | 2/2007 |
| KR | 20100033125 A | 3/2010 |
| KR | 101123928 B1 | 3/2012 |
| KR | 20120087480 A | 8/2012 |
| KR | 20150058001 A | 5/2015 |
| KR | 20170047880 A | 5/2017 |
| KR | 20170061464 A | 6/2017 |
| KR | 20170110956 A | 10/2017 |
| KR | 101811343 B1 | 12/2017 |
| KR | 20180028606 A | 3/2018 |
| KR | 20180051147 A | 5/2018 |
| KR | 20190060692 A | 6/2019 |
| WO | 2017-170267 A1 | 10/2017 |
| WO | 2018-117109 A1 | 6/2018 |
| WO | 2019172539 A1 | 9/2019 |

OTHER PUBLICATIONS

Extended European Search Report for Application No. 21766097.6 dated Mar. 22, 2022, pp. 1-6.
Extended European Search Report for Application No. 21770106.9 dated Mar. 28, 2022, pp. 1-7.
Extended European Search Report for Application No. 21777192.2 dated Mar. 22, 2022, pp. 1-6.
Extended European Search Report for Application No. 21780843.5 dated Mar. 22, 2022, pp. 1-6.
Extended European Search Report for Application No. 21782025.7 dated Mar. 22, 2022, pp. 1-6.
Search report from International Application No. PCT/KR2021/001626, mailed May 27, 2021, 2 pages.
Search report from International Application No. PCT/KR2021/001629, mailed May 27, 2021, 2 pages.
Search Report dated Nov. 16, 2023 from the Office Action for Chinese Application No. 202180002529.5 issued Nov. 22, 2023, 2 pages. [See p. 1, categorizing the cited reference].
Search report from International Application No. PCT/KR2021/001631, mailed May 17, 2021. 4 pgs.
Search report from International Application No. PCT/KR2021/001627, mailed May 26, 2021. 3 pgs.
3 Search report from International Application No. PCT/KR2021/001621, mailed May 17, 2021. 3 pgs.
Dortmund Data Bank. "Vapor pressure of 1,3-Butadiene", Retrieved from the Internet: <www.ddbst.com/en/EED/PCPNAP_C364.php>, (Jan. 2023). 2 pgs.

* cited by examiner

CARBOXYLIC ACID MODIFIED-NITRILE BASED COPOLYMER LATEX

CROSS-REFERENCE TO RELATED APPLICATIONS

The present application is a national phase entry under 35 U.S.C. § 371 of International Application No. PCT/KR2021/001621, filed on Feb. 8, 2021, which claims priority to Korean Patent Application No. 10-2020-0039060, filed on Mar. 31, 2020, Korean Patent Application No. 10-2020-0039067, filed on Mar. 31, 2020, Korean Patent Application No. 10-2020-0039076, filed on Mar. 31, 2020, Korean Patent Application No. 10-2020-0039074, filed on Mar. 31, 2020, Korean Patent Application No. 10 2020-0039065, filed on Mar. 31, 2020, Korean Patent Application No. 10-2020-0039071, filed on Mar. 31, 2020, and Korean Patent Application No. 10-2020-0173051, filed on Dec. 11, 2020, the entire contents of which are incorporated herein by reference.

TECHNICAL FIELD

The present invention relates to a carboxylic acid-modified nitrile-based copolymer latex having excellent polymerization stability which is capable of producing a dip-molded article having high elasticity and has excellent workability when producing a molded article.

BACKGROUND ART

Usage of a disposable rubber glove has increased in various fields such as housework, the food industry, the electronic industry, and medical fields. In the past, a disposable glove was made by dip molding a natural rubber latex, but a protein was problematic due to an allergic reaction, such as pain or a rash, in some users. Due to these problems, recently, a disposable glove formed by dip molding a nitrile-based latex, which has a high tensile strength, an excellent chemical resistance, and no risk of allergy, has been spotlighted in order to replace natural rubber.

However, since the nitrile-based rubber glove obtained by using the nitrile-based latex is inferior to a natural rubber glove in terms of elasticity, the nitrile-based rubber glove still cannot replace the natural rubber glove in uses such as a surgical glove where maintenance of adhesion when wearing for a long time are important.

Therefore, various studies have been conducted to improve the elasticity of the glove. However, conventionally, studies on a change of a cross-linking agent such as changing a ratio between zinc oxide, sulfur, and a vulcanization accelerator to be added together with the latex in the production of the glove, or adding a new cross-linking agent have been mainly conducted rather than studies on a latex required for producing a glove having high elasticity. However, in a case where the elasticity is improved through only the change of the cross-linking agent, other physical properties, such as a tensile strength and durability, of the glove may be deteriorated. In addition, in a case where sulfur or a vulcanization accelerator is excessively used, discoloration of the glove or an IV type allergy may occur.

Therefore, there is a need for development of a latex itself to improve the elasticity of the nitrile-based glove. It is required to appropriately adjust a structure of latex particles in order to develop such a glove having excellent elasticity. A structure of latex particles in the carboxylic acid-modified nitrile-based copolymer latex is one of the factors having a great influence on polymerization stability when preparing the latex and workability when producing the glove. Even in a case where a latex capable of implementing the best elasticity is prepared, when the polymerization stability when preparing the latex is deteriorated and the workability when producing the glove is poor, there is a limit in actual industrial application.

DISCLOSURE

Technical Problem

In order to solve the problems mentioned in the background art, an object of the present invention is to provide a carboxylic acid-modified nitrile-based copolymer latex having excellent workability when producing a molded article and having excellent polymerization stability when preparing a latex to improve elasticity of a nitrile-based rubber glove.

That is, an object of the present invention is to improve elasticity of a nitrile-based rubber glove including a carboxylic acid-modified nitrile-based copolymer latex and to improve workability when producing a molded article and polymerization stability when preparing a latex, by adjusting a ratio P of a capillary viscosity ($CV_D$) of the carboxylic acid-modified nitrile-based copolymer latex in a de-swollen state to a capillary viscosity ($CV_0$) of the carboxylic acid-modified nitrile-based copolymer latex in a swollen state in a methyl ethyl ketone solvent, to a range of 0.85 to 1.0, adjusting a value of M obtained by multiplying an insolubility of a dried film of the carboxylic acid-modified nitrile-based copolymer latex in the methyl ethyl ketone solvent and a swelling index of the dried film of the carboxylic acid-modified nitrile-based copolymer latex in the methyl ethyl ketone solvent, to a range of 5 to 20, and adjusting a pKa which is an index indicating a degree of ionization of an ethylenic unsaturated acid in the carboxylic acid-modified nitrile-based copolymer latex, to a range of 9.5 to 10.2.

Technical Solution

In one general aspect, a carboxylic acid-modified nitrile-based copolymer latex includes a carboxylic acid-modified nitrile-based copolymer including a conjugated diene-based monomer-derived unit, an ethylenic unsaturated nitrile-based monomer-derived unit, and an ethylenic unsaturated acid monomer-derived unit, wherein a pKa is 9.5 to 10.2, and the carboxylic acid-modified nitrile-based copolymer latex satisfies the following General Formula 1 and General Formula 2:

$$0.85 \le P \le 1.0, P = CV_D/CV_0 \quad \text{[General Formula 1]}$$

$$5 \le M \le 20, M = m_1 \times m_2 \quad \text{[General Formula 2]}$$

in General Formula 1, $CV_0$ represents a capillary viscosity of the carboxylic acid-modified nitrile-based copolymer latex measured in a swollen state in a methyl ethyl ketone solvent, and $CV_D$ represents a capillary viscosity of the carboxylic acid-modified nitrile-based copolymer latex in a de-swollen state, and in General Formula 2, $m_1$ represents an insolubility of a dried film of the carboxylic acid-modified nitrile-based copolymer latex in the methyl ethyl ketone solvent, and $m_2$ represents a swelling index of the dried film of the carboxylic acid-modified nitrile-based copolymer latex in the methyl ethyl ketone solvent.

Advantageous Effects

According to the carboxylic acid-modified nitrile-based copolymer latex according to the present invention, a ratio P of the capillary viscosity ($CV_D$) of the carboxylic acid-modified nitrile-based copolymer latex in the de-swollen state to the capillary viscosity ($CV_O$) of the carboxylic acid-modified nitrile-based copolymer latex in the swollen state in the methyl ethyl ketone solvent is adjusted to a range of 0.85 to 1.0, a value of M obtained by multiplying the insolubility of the dried film of the carboxylic acid-modified nitrile-based copolymer latex in the methyl ethyl ketone solvent and the swelling index of the dried film of the carboxylic acid-modified nitrile-based copolymer latex in the methyl ethyl ketone solvent is adjusted to a range of 5 to 20, and the pKa which is the index indicating the degree of ionization of the ethylenic unsaturated acid in the carboxylic acid-modified nitrile-based copolymer latex is adjusted to a range of 9.5 to 10.2, such that elasticity of a molded article produced by using the carboxylic acid-modified nitrile-based copolymer latex may be improved, and workability when producing the molded article and polymerization stability when preparing the latex may be improved.

BEST MODE

Figure 1:
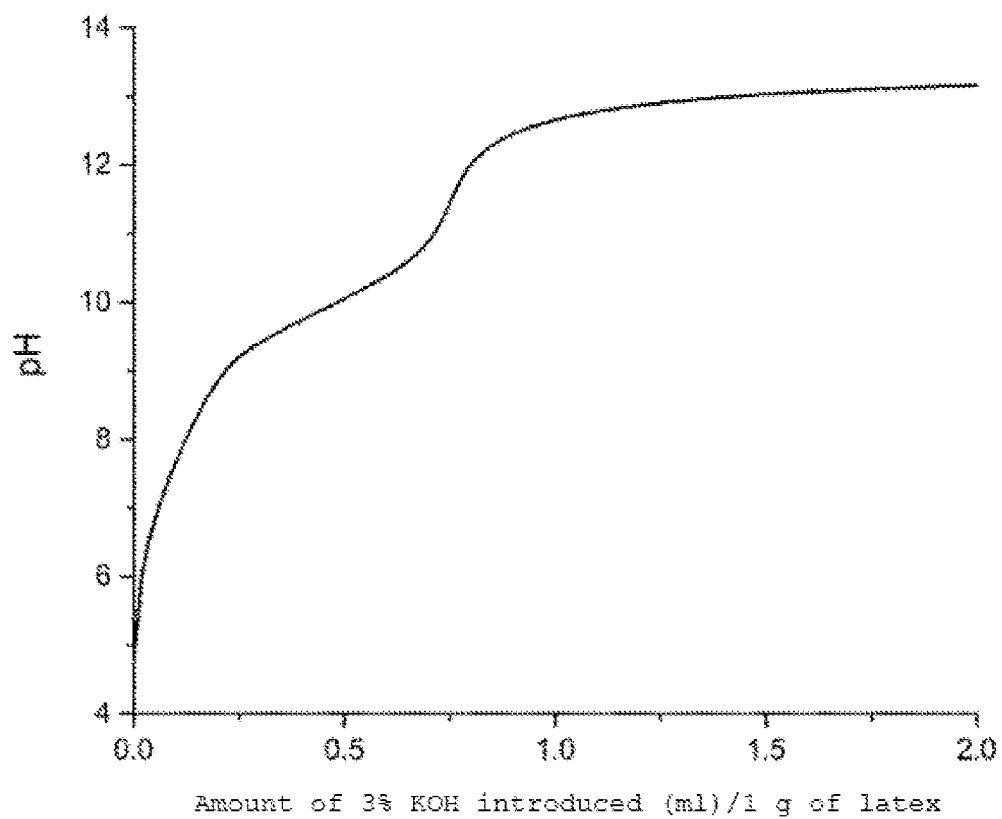
FIG. 1 is a graph showing a change in pH according to an addition amount of KOH.

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "a monomer-derived unit" in the present invention may refer to a component, a structure, or a material itself derived from a monomer, and as a specific example, may refer to a unit formed in the polymer by the introduced monomer participating in the polymerization reaction during polymerization.

The term "latex" in the present invention may refer to a polymer or copolymer polymerized by polymerization being present in a form dispersed in water, and as a specific example, may refer to fine particles of a polymer in a rubber phase or a copolymer in a rubber phase polymerized by emulsion polymerization being present in a form dispersed in water in a colloid state.

The term "derived layer" in the present invention may represent a layer formed from a polymer or a copolymer, and as a specific example, a layer formed from a polymer or a copolymer by attaching, fixing, and/or polymerizing the polymer or the copolymer on a dip mold during manufacture of molded article by dip molding.

The term, "cross-linking agent-derived cross-linking part" in the present invention may refer to a component, a structure, or a material itself caused by a compound, or a cross-linking part serving as a cross-linker in a polymer or between polymers, formed by the action or reaction of the cross-linking agent composition.

The term "alkyl" in the present invention may refer to a linear or branched saturated monovalent hydrocarbon of carbon atoms, such as, methyl, ethyl, propyl, 2-propyl, n-butyl, iso-butyl, tert-butyl, pentyl, hexyl, and dodecyl, or may include alkyl substituted by a substituent as well as unsubstituted alkyl.

The term "aryl" in the present invention may refer to an alkyl group as defined above in which one or more hydrogen atoms are substituted by an aryl group, such as phenyl, naphthalenyl, and fluorenyl, or may include aryl substituted by a substituent as well as unsubstituted aryl.

The term "(meth)acrylate" in the present invention may refer to both acrylate and methacrylate.

Hereinafter, the present invention will be described in more detail in order to assist in the understanding of the present invention.

According to the present invention, there is provided a carboxylic acid-modified nitrile-based copolymer latex capable of improving elasticity and softness of a molded article produced by using the carboxylic acid-modified nitrile-based copolymer latex. A carboxylic acid-modified nitrile-based copolymer in the carboxylic acid-modified nitrile-based copolymer latex may include a conjugated diene-based monomer-derived unit, an ethylenic unsaturated nitrile-based monomer-derived unit, and an ethylenic unsaturated acid monomer-derived unit.

The conjugated diene-based monomer constituting the the conjugated diene-based monomer-derived unit may be one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene or isoprene.

A content of the conjugated diene-based monomer-derived unit may be 64.5 wt % to 83.5 wt %, or 67.5 wt % to 79.5 wt %, with respect to a total content of the carboxylic acid-modified nitrile-based copolymer. Within this range, the carboxylic acid-modified nitrile-based copolymer latex may have excellent polymerization stability when being prepared and excellent workability when producing the molded article, and a molded article produced by using a latex composition for dip molding comprising the carboxylic acid-modified nitrile-based copolymer latex may have high elasticity.

The ethylenic unsaturated nitrile-based monomer constituting the ethylenic unsaturated nitrile-based monomer-derived unit may be one or more selected from the group consisting of acrylonitrile, methacrylonitrile, fumaronitrile, α-chloronitrile, and α-cyanoethylacrylonitrile. As a specific example, the ethylenic unsaturated nitrile-based monomer may be acrylonitrile or methacrylonitrile, and as a more specific example, the ethylenic unsaturated nitrile-based monomer may be acrylonitrile.

A content of the ethylenic unsaturated nitrile-based monomer-derived unit may be 15 wt % to 30 wt %, or 18 wt % to 28 wt %, with respect to the total content of the carboxylic acid-modified nitrile-based copolymer. Within this range, the carboxylic acid-modified nitrile-based copolymer latex may have excellent polymerization stability when being prepared and excellent workability when producing the molded article, and a molded article produced by using a latex composition for dip molding comprising the carboxylic acid-modified nitrile-based copolymer latex may have high elasticity.

The ethylenic unsaturated acid monomer constituting the ethylenic unsaturated acid monomer-derived unit may be an ethylenic unsaturated monomer having an acid group such as a carboxyl group, a sulfonic acid group, or an acid anhydride group. As a specific example, the ethylenic unsaturated acid monomer may include one or more selected from the group consisting of an ethylenic unsaturated acid monomer such as acrylic acid, methacrylic acid, itaconic acid, maleic acid, or fumaric acid; polycarboxylic acid anhydride such as maleic acid anhydride or citraconic acid anhydride; an ethylenic unsaturated sulfonic acid monomer such as styrenesulfonic acid; and an ethylenic unsaturated polycarboxylic acid partial ester monomer such as monobutyl fumarate, monobutyl maleate, or mono-2-hydroxypropyl maleate. As a more specific example, the ethylenic unsaturated acid monomer may be one or more selected from the group consisting of acrylic acid, methacrylic acid, itaconic acid, maleic acid, and fumaric acid. As a still more specific example, the ethylenic unsaturated acid monomer may be methacrylic acid. The ethylenic unsaturated acid monomer may be used in a form of a salt such as an alkali metal salt or an ammonium salt during polymerization.

A content of the ethylenic unsaturated acid monomer-derived unit may be 1.5 wt % to 5.5 wt %, or 2.5 wt % to 4.5 wt %, with respect to the total content of the carboxylic acid-modified nitrile-based copolymer. Within this range, the carboxylic acid-modified nitrile-based copolymer latex may have excellent polymerization stability when being prepared and excellent workability when producing the molded article, and a molded article produced by using a latex composition for dip molding comprising the carboxylic acid-modified nitrile-based copolymer latex may have high elasticity.

The carboxylic acid-modified nitrile-based copolymer latex of the present invention may further selectively include an ethylenic unsaturated monomer-derived unit, in addition to the conjugated diene-based monomer-derived unit, the ethylenic unsaturated nitrile-based monomer-derived unit, and the ethylenic unsaturated acid monomer-derived unit.

The ethylenic unsaturated monomer constituting the ethylenic unsaturated monomer-derived unit may include one or more selected from the group consisting of a hydroxyalkyl (meth)acrylate monomer having 1 to 4 carbon atoms; a vinyl aromatic monomer selected from the group consisting of styrene, alkylstyrene, and vinyl naphthalene; a fluoroalkyl vinyl ether monomer such as fluoro ethyl vinyl ether; an ethylenic unsaturated amide monomer selected from the group consisting of (meth)acrylamide, N-methylol (meth)acrylamide, N,N-dimethylol (meth)acrylamide, N-methoxymethyl (meth)acrylamide, and N-propoxymethyl (meth)acrylamide; a non-conjugated diene monomer such as vinyl pyridine, vinyl norbornene, dicyclopentadiene, or 1,4-hexadiene; and an ethylenic unsaturated carboxylic acid ester monomer selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylamino ethyl (meth)acrylate.

In a case where the ethylenic unsaturated monomer-derived unit is selectively included in the carboxylic acid-modified nitrile-based copolymer, a content of the ethylenic unsaturated monomer-derived unit may be 0.5 wt % to 5 wt % with respect to the total content of the carboxylic acid-modified nitrile-based copolymer. Within this range, it is possible to improve properties such as a tensile strength of the molded article formed of the latex composition for dip molding comprising the carboxylic acid-modified nitrile-based copolymer.

The carboxylic acid-modified nitrile-based copolymer latex of the present invention has a monomer composition in which the contents of the ethylenic unsaturated nitrile-based monomer and the ethylenic unsaturated acid monomer are optimized, such that polymerization stability when preparing the latex is excellent, elasticity of a molded article formed of the carboxylic acid-modified nitrile-based copolymer latex is excellent, and workability when producing the molded article is excellent.

In the present invention, features of the latex that have never been applied before may be applied by controlling not only the monomer composition in the carboxylic acid-modified nitrile-based copolymer latex but also process factors of a preparation method described below.

Specifically, first, a preparation method of the carboxylic acid-modified nitrile-based copolymer latex includes a polymerization step of adding and polymerizing a conjugated diene-based monomer, an ethylenic unsaturated nitrile-based monomer, and an ethylenic unsaturated acid monomer into a polymerization reactor.

The polymerization step is performed to form a main chain of the carboxylic acid-modified nitrile-based copolymer latex, and the polymerization is performed by emulsion polymerization. In this case, the monomers are first added to the polymerization reactor prior to a polymerization reaction in the types and contents described above. The monomers may be separately added, added at the same time, or continuously added. For example, in a case where the monomers are added at the same time, the conjugated diene-based monomer, the ethylenic unsaturated nitrile-based monomer, and the ethylenic unsaturated acid monomer may be added to the polymerization reactor at the same time. In addition, in a case where the monomers are separately added, the monomers may be separately added by primarily adding a part of the monomers to the polymerization reactor and secondarily adding the remaining monomers to the polymerization reactor. As a specific example, in the primary addition, the ethylenic unsaturated nitrile-based monomer and the ethylenic unsaturated acid monomer may be added, and in the secondary addition, the conjugated diene-based monomer may be added.

In addition, in a case where the monomers are added prior to the polymerization reaction, additives such as an emulsifier and a chain transfer agent and a medium may be added at the same time or may be separately added after the monomers are added and stirring is started. For example, in the case where the monomers are added at the same time prior to the polymerization reaction, the additives and the medium may be added after the addition of the monomers. In the case where the monomers are separately added prior to the polymerization reaction, the additives and the medium may be added between the primary addition and the secondary addition. In a case where the monomers are first added prior to the addition of the additives and the medium and then stirring is performed, the composition and amounts of the monomers dissolved in an aqueous phase at the beginning of the polymerization reaction are affected, which affects a molecular weight of the carboxylic acid-modified nitrile-based copolymer to be polymerized or an acid distribution of the copolymer in latex particles.

Thereafter, in the polymerization step, the polymerization reaction is started by adding a polymerization initiator, and the conjugated diene-based monomer, the ethylenic unsaturated nitrile-based monomer, and the ethylenic unsaturated acid monomer may be added first, second, and third during the polymerization reaction, that is, may be separately added in the $n^{th}$ order depending on the types of the monomers.

As such, in the case where the monomers are separately added by controlling the timing of addition of the monomers during the polymerization reaction, when a monomer-derived unit is formed from each monomer in the carboxylic acid-modified nitrile-based copolymer, a distribution of the monomers according to a difference in reaction speed of each monomer may be uniform. Therefore, a balance between physical properties of the molded article produced by using the carboxylic acid-modified nitrile-based copolymer may be improved.

In addition, in the case where the monomers are separately added during the polymerization reaction, the additives such as the emulsifier and the chain transfer agent and the medium may be separately added accordingly. In this case, the distribution of the monomers according to the difference in reaction speed of each monomer may be easily controlled, and a balance between physical properties of the molded article produced by using the carboxylic acid-modified nitrile-based copolymer may be improved.

One or more selected from the group consisting of an anionic surfactant, a nonionic surfactant, a cationic surfactant, and an amphoteric surfactant may be used as the emulsifier. As a specific example, the emulsifier may be one or more anionic surfactants selected from the group consisting of alkyl benzene sulfonate, aliphatic sulfonate, a higher alcohol sulfate ester salt, α-olefin sulfonate, and alkyl ether sulfate. In addition, the emulsifier is added in an amount of 2 parts by weight to 4 parts by weight with respect to a total content of 100 parts by weight of the monomers to be added in the polymerization step. In general, when the amount of the emulsifier is large, a particle size of the particle of the carboxylic acid-modified nitrile-based copolymer is reduced, resulting in excellent stability, whereas, in the production process of the molded article, it is difficult to remove the emulsifier and the amount of foam generated is increased, which makes it difficult to produce the molded article.

The chain transfer agent may include one or more selected from the group consisting of α-methylstyrene dimer; mercaptans such as t-dodecyl mercaptan, n-dodecyl mercaptan, and octyl mercaptan; halogenated hydrocarbon such as carbon tetrachloride, methylene chloride, or methylene bromide; and a sulfur-containing compound such as tetraethylthiuram disulfide, dipentamethylenethiuram disulfide, or diisopropyl xanthogen disulfide. As a specific example, the chain transfer agent may be mercaptans. The chain transfer agent may be added in an amount of 0.2 parts by weight to 0.9 parts by weight with respect to the total content of 100 parts by weight of the monomers to be added in the polymerization step. Within the above range, physical properties of the molded article may be excellent.

As a specific example, deionized water may be used as the medium. A temperature of the water used as the medium during the polymerization of the carboxylic acid-modified nitrile-based copolymer may be 40° C. to 90° C. or 45° C. to 80° C. In general, emulsion polymerization is performed using water at room temperature as polywater. However, in a case where the high-temperature water is used as polywater, the composition and amounts of the monomers dissolved in the aqueous phase and the amounts of the emulsifier and the chain transfer agent are affected, which affects the acid distribution of the copolymer to be polymerized in the carboxylic acid-modified nitrile-based copolymer latex particles or an entanglement degree of the copolymer. In addition, the medium may be added in an amount of 105 parts by weight to 140 parts by weight with respect to the total content of 100 parts by weight of the monomers to be added in the polymerization step.

When the carboxylic acid-modified nitrile-based copolymer is polymerized, an additive such as a chelating agent, a dispersant, a pH adjuster, a deoxidizer, a particle size adjuster, an anti-aging agent, or an oxygen scavenger may be further added, if necessary.

The polymerization reaction may be started by adding a polymerization initiator.

A radical initiator may be used as the polymerization initiator. It is possible to use one or more selected from the group consisting of inorganic peroxide such as sodium persulfate, potassium persulfate, ammonium persulfate, potassium perphosphate, or hydrogen peroxide; organic peroxide such as diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, benzoyl peroxide, 3,5,5-trimethylhexanol peroxide, or t-butyl peroxy isobutylate; and a nitrogen compound such as azobisisobutyronitrile, azobis-2,4-dimethylvaleronitrile, azobiscyclohexanecarbonitrile, or methyl azobis(isobutyrate). As a specific example, the polymerization initiator may be inorganic peroxide, and as a more specific example, the polymerization initiator may be a persulfate initiator. In addition, the polymerization initiator may be added in an amount of 0.1 parts by weight to 0.5 parts by weight with respect to the total content of 100 parts by weight of the monomers to be added in the polymerization step. Within this range, a polymerization speed may be maintained at an appropriate level.

Here, in a case where the organic peroxide or the inorganic peroxide is used as the polymerization initiator, the organic peroxide or the inorganic peroxide may be used in combination with an activator. As the activator, a compound containing metal ions in a reduced state, such as ferrous sulfate and cuprous naphthenate; a sulfonic acid compound such as sodium methanesulfonate; and an amine compound such as dimethylaniline may be used alone or in combination of two or more thereof. Specifically, as the activator, it is possible to use one or more selected from the group consisting of sodium formaldehyde sulfoxylate, sodium ethylenediaminetetraacetate, ferrous sulfate, dextrose, sodium pyrophosphate, and sodium sulfite. The activator may be added in an amount of 0.05 parts by weight to 1 part by weight with respect to the total content of 100 parts by weight of the monomers to be added in the polymerization step. Within this range, the polymerization speed may be maintained at an appropriate level.

The polymerization of the carboxylic acid-modified nitrile-based copolymer may be performed at a temperature of 5° C. to 60° C. Within this range, the polymerization speed may be maintained at an appropriate level.

In addition, the polymerization of the carboxylic acid-modified nitrile-based copolymer may be performed by controlling a change in reaction pressure relative to an initial reaction pressure according to a polymerization conversion rate to be in a specific range. Specifically, the reaction pressure at the beginning of the polymerization may be in a range of 2.0 kgf/cm² to 2.8 kgf/cm², and the reaction pressure when the polymerization conversation rate is 1% to 45% may be controlled in a range of 15% or less of an increase amount of the pressure relative to the reaction pressure at the beginning of the polymerization. In particular, the reaction pressure when the polymerization conversation rate is 40% may be in a range of 5% to 10% of the increase amount of the pressure relative to the reaction pressure at the beginning of the polymerization.

The reaction pressure when the polymerization conversation rate is 46% to 75% may be controlled in a range of 5% to 70% of the increase amount of the pressure relative to the reaction pressure at the beginning of the polymerization. In particular, the reaction pressure when the polymerization conversation rate is 60% may be in a range of 30% to 65% of the increase amount of the pressure relative to the reaction pressure at the beginning of the polymerization.

The reaction pressure from the time when the polymerization conversation rate is 76% until the polymerization is terminated may be controlled in a range of 0% to 5% of the increase amount of the pressure relative to the reaction pressure at the beginning of the polymerization or in a range of 0% to 100% of a decrease amount of the pressure relative to the reaction pressure at the beginning of the polymerization. In particular, the reaction pressure when the polymerization conversation rate is 90% may be adjusted to a range of 10% or more of the decrease amount of the pressure relative to the reaction pressure at the beginning of the polymerization.

In the polymerization reaction of the carboxylic acid-modified nitrile-based copolymer, the polymerization conversion rate may be measured by a method commonly known in the art. For example, a predetermined amount of sample is collected from a reaction composition at a predetermined time interval, a solid content is measured, and then, a polymerization conversion rate is calculated according to the following Equation 1.

Polymerization conversion rate (%)=[{(parts by weight of added monomers and additives)*solid content (%)−(parts by weight of additives added other than monomers)}/(total parts by weight of added monomers)]*100        [Equation 1]

In Equation 1, parts by weight are based on the total content of 100 parts by weight of the monomers to be added. A sectional polymerization conversion rate may be calculated by reflecting parts by weight of the monomers and additives added until a corresponding section.

When the change in reaction pressure relative to the initial reaction pressure according to the polymerization conversion rate is adjusted to be in the above range, the composition and amounts of the monomers dissolved in the aqueous phase during the polymerization reaction are affected depending on the reaction pressure, which affects an entanglement degree or a branch degree of the carboxylic acid-modified nitrile-based copolymer to be polymerized.

The preparation method of the carboxylic acid-modified nitrile-based copolymer latex includes a step of terminating the polymerization reaction and obtaining a carboxylic acid-modified nitrile-based copolymer latex. The polymerization reaction is terminated by cooling the polymerization system at the time when the polymerization conversion rate is 85% or more, or adding a polymerization terminator, a pH adjuster, or an antioxidant.

In addition, the preparation method of the carboxylic acid-modified nitrile-based copolymer latex may include a step of removing unreacted monomers by a deodorization process after the reaction is terminated.

In the present invention, in order to implement excellent rubber elasticity of the molded article produced by a dip-molding process using the carboxylic acid-modified nitrile-based copolymer latex, excellent workability when producing a glove, and excellent polymerization stability of the latex, the amounts of the ethylenic unsaturated nitrile-based monomer and the ethylenic unsaturated acid monomer are optimized in the composition of the monomers in the latex, and in the polymerization step, a structure of the latex particles is optimized by adjusting the entanglement degree or the branch degree and the molecular weight of the carboxylic acid-modified nitrile-based copolymer, the acid distribution of the copolymer in the latex particles, and the like.

Such a carboxylic acid-modified nitrile-based copolymer may be prepared by the composition and polymerization method of the copolymer described above. In the present invention, a numerical range of each parameter that satisfies the physical properties required by the present inventors is determined by using the following various parameters while adjusting the physical properties of the carboxylic acid-modified nitrile-based copolymer.

According to an exemplary embodiment of the present invention, the carboxylic acid-modified nitrile-based copolymer latex may satisfy the following General Formula 1 and General Formula 2, and a pKa which is an index indicating a degree of ionization of an ethylenic unsaturated acid in the carboxylic acid-modified nitrile-based copolymer latex may be a range of 9.5 to 10.2.

$0.85 \leq P \leq 1.0, P = CV_D/CV_0$        [General Formula 1]

$5 \leq M \leq 20, M = m_1 \times m_2$        [General Formula 2]

In General Formula 1, $CV_0$ represents a capillary viscosity of the carboxylic acid-modified nitrile-based copolymer latex measured in a swollen state in a methyl ethyl ketone solvent, and $CV_D$ represents a capillary viscosity of the carboxylic acid-modified nitrile-based copolymer latex in a de-swollen state, and in General Formula 2, $m_1$ represents an insolubility of a dried film of the carboxylic acid-modified nitrile-based copolymer latex in the methyl ethyl ketone solvent, and $m_2$ represents a swelling index of the dried film of the carboxylic acid-modified nitrile-based copolymer latex in the methyl ethyl ketone solvent.

In General Formula 1, $CV_0$ represents a capillary viscosity of the carboxylic acid-modified nitrile-based copolymer latex measured in a swollen state in the methyl ethyl ketone solvent. In general, the capillary viscosity is used as a means for measuring a molecular weight of a non-cross-linked polymer. However, in the present invention, $CV_0$ represents a capillary viscosity measured in a state where the copolymer particles in the latex are swollen in the methyl ethyl ketone solvent, that is, a swollen state of the copolymer particles in the latex, unlike such a general capillary viscosity. Therefore, it is possible to acquire, from $CV_0$, information on not only the molecular weight of the copolymer in the carboxylic acid-modified nitrile-based copolymer latex but also factors affecting the swelling by the methyl ethyl ketone solvent, and among this information, in particular, information on the acid distribution of the copolymer in the latex particles may be efficiently acquired. $CV_0$ may be 0.5 to 4 or 1 to 3. That is, since the carboxylic acid-modified nitrile-based copolymer latex satisfying the range of $CV_0$ has an appropriate level of the molecular weight of the copolymer and the optimal acid distribution of the copolymer in the latex particles, in a case where this carboxylic acid-modified nitrile-based copolymer latex is used in a latex composition for dip molding, it is possible to implement physical properties of a molded article, in particular, a molded article having high elongation and excellent softness.

In this case, $CV_0$ may be measured using a Cannon-Fenske routine type capillary viscometer (SI Analytics GmbH Type No. 520 13) and a methyl ethyl ketone (MEK) solvent under a condition of a pH of 8.2 to 9.2.

In General Formula 1, $CV_D$ represents a capillary viscosity of the carboxylic acid-modified nitrile-based copolymer latex in a de-swollen state.

Specifically, a state where the copolymer particles in the latex are swollen in the methyl ethyl ketone solvent may be defined as the swollen state, and the de-swollen state may refer to a state where a swollen portion of the copolymer particles in the latex in the methyl ethyl ketone solvent is removed. For example, a state where a portion of the copolymer particles dissolved in the methyl ethyl ketone solvent is removed by applying a predetermined energy to the copolymer particles in the latex in the swollen state may refer to the de-swollen state. $CV_D$ may be a capillary viscosity measured by dissolving the carboxylic acid-modified nitrile-based copolymer latex in the methyl ethyl ketone solvent under a condition of a pH of 8.2 to 9.2, and de-swelling the carboxylic acid-modified nitrile-based copolymer latex by applying an energy of 55 kcal to 65 kcal using an ultrasonicator (Bransonic® M Mechanical Bath 5800) for 40 minutes. In the case, the capillary viscosity may be measured in the same method as that in the measurement of $CV_0$ using the Cannon-Fenske routine type capillary viscometer (SI Analytics GmbH Type No. 520 13).

In addition, P may refer to a ratio of $CV_0$ and $CV_D$. Specifically, P may refer to a ratio of $CV_D$ to $CV_0$. More specifically, P may refer to a ratio of the capillary viscosity of the carboxylic acid-modified nitrile-based copolymer latex in the de-swollen state to the capillary viscosity of the carboxylic acid-modified nitrile-based copolymer latex in the swollen state in the methyl ethyl ketone solvent. P may be 0.85 to 1 or 0.9 to 1. When a value of P of the carboxylic acid-modified nitrile-based copolymer latex is within the above range, it may mean that a change in capillary viscosity is small even when the carboxylic acid-modified nitrile-based copolymer latex is de-swollen by applying an additional energy. This may mean that the carboxylic acid-modified nitrile-based copolymer latex has a structure in which the portion dissolved in the methyl ethyl ketone solvent is relatively small and the portion to be dissolved when being de-swollen is difficult to escape. That is, this may mean the entanglement degree of the copolymer particles in the latex is relatively large and the carboxylic acid-modified nitrile-based copolymer latex has a latex particle structure in which an entangled copolymer is hardly untangled. Accordingly, it is possible to acquire, from P, information on the latex particle structure such as the entanglement degree or the branch degree of the copolymer in the carboxylic acid-modified nitrile-based copolymer latex.

In order to improve elasticity, that is, a stress retention rate of the molded article produced by using the latex composition for dip molding required in the present invention, there is a need for a carboxylic acid-modified nitrile-based copolymer latex having a structure in which the entanglement degree or branch degree of the copolymer in the carboxylic acid-modified nitrile-based copolymer latex is increased. This is for the purpose of imparting the original elasticity of rubber to the latex, and, for example, even in a case where cross-linking is performed with a cross-linking agent that remarkably increases the stress retention rate, a stress retention rate of the existing latex having a linear chain is not increased because it does not inherently have elasticity. On the other hand, since the latex of the present invention having a structure in which the entanglement degree or the branch degree is increased has rubber elasticity, when this latex is used in a latex composition for dip molding, elasticity of a molded article, that is, a stress retention rate may be improved.

Therefore, the carboxylic acid-modified nitrile-based copolymer latex of the present invention satisfying the range of P has an appropriate level of the entanglement degree of the copolymer and a latex particle structure in which the entangled copolymer is hardly untangled. When this carboxylic acid-modified nitrile-based copolymer latex is used in a latex composition for dip molding, elasticity of a molded article, that is, a stress retention rate may be improved.

In General Formula 2, a value of M is a value expressed by multiplying the insolubility of the dried film of the carboxylic acid-modified nitrile-based copolymer latex in the methyl ethyl ketone solvent and the swelling index of the dried film of the carboxylic acid-modified nitrile-based copolymer latex in the methyl ethyl ketone solvent. The value may be in a range of 5.0 to 20 or 7 to 15. The insolubility of the dried film of the carboxylic acid-modified nitrile-based copolymer latex in the methyl ethyl ketone solvent is an index indicating a degree of cross-linking of the carboxylic acid-modified nitrile-based copolymer contained in the carboxylic acid-modified nitrile-based copolymer latex. The swelling index of the dried film of the carboxylic acid-modified nitrile-based copolymer latex in the methyl ethyl ketone solvent is an index indicating swellability of the carboxylic acid-modified nitrile-based copolymer contained in the carboxylic acid-modified nitrile-based copolymer latex in the methyl ethyl ketone solvent. Therefore, from M obtained by multiplying these two indices, it is possible to acquire information on the entanglement degree of the carboxylic acid-modified nitrile-based copolymer latex or the acid distribution of the copolymer in the latex particles.

In addition, in the carboxylic acid-modified nitrile-based copolymer latex, a pKa, which is the index indicating the degree of ionization of the ethylenic unsaturated acid in the carboxylic acid-modified nitrile-based copolymer latex, may be in a range of 9.2 to 10.5 or 9.5 to 10.2. The information on the acid distribution of the copolymer in the latex particles may be acquired from the value of pKa.

The carboxylic acid-modified nitrile-based copolymer latex satisfying the ranges of M and pKa has an appropriate level of the entanglement degree of the copolymer and the optimal acid distribution of the copolymer in the latex particles.

When a molded article is produced by using a latex composition for dip molding, calcium ions are generally used for coagulation. As the calcium ions are eluted to a surface of a glove, coagulation of the latex occurs. Thus, a wet gel structure of the particles to form a film is formed. In this case, when the calcium particles are not sufficiently eluted, a flow mark occurs, and in severe cases, not only is an appearance of the glove poor, but stability of the composition is deteriorated, which adversely affects the physical properties of the dip-molded article. In order to suppress the flow mark, in the carboxylic acid-modified nitrile-based copolymer latex, an appropriate level of the entanglement degree of the copolymer is required so as to appropriately adjust deformation and pressurization speeds of the copolymer during coagulation. When the entanglement degree is too low, the deformation and pressurization speeds of the copolymer are fast, and thus, an elution speed becomes too fast, which causes a deterioration of workability when performing dip molding and an increase of the flow mark. On the other hand, when the entanglement degree is too high, the deformation and pressurization speeds are too slow, which causes a deterioration of general physical properties of the dip-molded article.

In addition, the acid distribution of the carboxylic acid-modified nitrile-based copolymer also affects the elution speed of the calcium ions, and this is because the acid itself causes the calcium ions to coagulate, and a distribution of the emulsifier varies depending on the acid distribution.

In the case of the carboxylic acid-modified nitrile-based copolymer latex of the present invention satisfying the range of M, the elution speed of the calcium ions is appropriately adjusted, and thus, a molded article capable of implementing excellent appearance physical properties of a glove may be produced without the flow mark. The optimal film is formed, such that it is possible to produce a molded article having excellent elasticity that is the object of the invention.

Meanwhile, the acid distribution indicated by the pKa has an importance influence on the polymerization stability. In the preparation of the latex, the ethylenic unsaturated acid monomer is one of the important factors for maintaining stability of the latex particles. Since the ethylenic unsaturated acid monomer is hydrophilic, the ethylenic unsaturated acid monomer is positioned on the surface of the latex particle. In the carboxylic acid-modified nitrile-based copolymer latex of the present invention, the conjugated diene-based monomer is used in a high ratio in order to produce a molded article having excellent elasticity. In particular, the conjugated diene-based monomer makes the inside of the particle swell to make a volume of the particle larger than other types of monomers. In this case, in a case where a large number of ethylenic unsaturated acid monomers are distributed inside the particles, it is difficult to maintain stability. In addition, in a case where the ethylenic unsaturated acid monomer is positioned on only the surface for the stability, physical properties of the dip-molded article are deteriorated.

Therefore, when the carboxylic acid-modified nitrile-based copolymer of the present invention satisfying the ranges of M and pKa is prepared, the stability of the latex during polymerization may be maintained, and in a case where this carboxylic acid-modified nitrile-based copolymer is used in the latex composition for dip molding, in the production process of the molded article, a flow mark may be prevented to improve the workability.

As such, the latex is prepared while confirming the numerical ranges of $CV_0$, P, M, and pKa, thereby completing the latex of the present invention.

According to the present invention, a latex composition for dip molding comprising the carboxylic acid-modified nitrile-based copolymer latex is provided.

According to an exemplary embodiment of the present invention, the latex composition for dip molding may comprise a carboxylic acid-modified nitrile-based copolymer latex and a cross-linking agent composition. The cross-linking agent composition may be used to form a cross-linking agent-derived cross-linking part through a cross-linking reaction of the carboxylic acid-modified nitrile-based copolymer.

The cross-linking agent composition may include a vulcanizing agent, a vulcanization accelerator, and a metal oxide.

The vulcanizing agent is used for vulcanizing the latex composition for dip molding, and may be sulfur, and as a specific example, the vulcanizing agent may be sulfur such as powdered sulfur, precipitated sulfur, colloidal sulfur, surface-treated sulfur, or insoluble sulfur. A content of the vulcanizing agent may be 0.3 parts by weight to 3 parts by weight with respect to the total content of 100 parts by weight of the carboxylic acid-modified nitrile-based copolymer in the latex composition for dip molding. Within this range, cross-linking ability by vulcanization may be excellent.

In addition, the vulcanization accelerator may be one or more selected from the group consisting of 2-mercaptobenzothiazole (MBT), 2,2-dithiobisbenzothiazole-2-sulfenamide (MBTS), N-cyclohexylbenzothiazole-2-sulfenamide (CBS), 2-morpholinothiobenzothiazole (MBS), tetramethylthiuram monosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. A content of the vulcanization accelerator may be 0.3 parts by weight to 3 parts by weight with respect to the total content of 100 parts by weight of the carboxylic acid-modified nitrile-based copolymer in the latex composition for dip molding. Within this range, cross-linking ability by vulcanization may be excellent.

The metal oxide may include zinc oxide, magnesium oxide, aluminum oxide, and the like. The metal oxide may be a cross-linking agent for forming a cross-linking part through ionic bonding in the carboxylic acid-modified nitrile-based copolymer or between carboxylic acid-modified nitrile-based copolymers by performing ionic bonding with a functional group of the ethylenic unsaturated acid monomer of the carboxylic acid-modified nitrile-based copolymer in the latex composition for dip molding. A content of the metal oxide may be 0.3 parts by weight to 3 parts by weight with respect to the total content of 100 parts by weight of the carboxylic acid-modified nitrile-based copolymer in the latex composition for dip molding. Within this range, ionic bonding ability is excellent and a tensile strength of the produced dip-molded article may be excellent.

In addition, according to an exemplary embodiment of the present invention, the latex composition for dip molding may further include an additive such as a dispersant, an antioxidant, a pigment, a filler, a thickening agent, or a pH adjuster, if necessary.

According to an exemplary embodiment of the present invention, a solid content (concentration) of the latex composition for dip molding may be, for example, 5 wt % to 43 wt %. Within this range, latex transport efficiency may be excellent, and an increase in viscosity of the latex may be prevented, such that storage stability may be excellent.

As another example, a pH of the latex composition for dip molding may be 9 to 11. Within this range, processability and productivity when producing a dip-molded article may be excellent. The pH of the latex composition for dip molding may be adjusted by addition of the pH adjuster described above. Examples of the pH adjuster may include an aqueous potassium hydroxide solution having a concentration of 1 wt % to 10 wt %, and ammonia water having a concentration of 1 wt % to 50 wt %.

According to the present invention, a molded article including a latex composition for dip molding-derived layer is provided. The molded article may be a dip-molded article produced by dip-molding the latex composition for dip molding.

A method of producing the molded article may include a step of dipping the latex composition for dip molding by a direct dipping method, an anode coagulation dipping method, a Teague's coagulation dipping method, or the like. As a specific example, the molded article may be produced by an anode coagulation dipping method, and in this case, a dip-molded article having a uniform thickness may be obtained.

As a specific example, the method of producing the molded article may include: a step S100 of attaching a coagulant to a dip molding mold; a step S200 of dipping the dip molding mold to which the coagulant is attached into a latex composition for dip molding to form a latex composition for dip molding-derived layer, that is, a dip-molded layer; and a step S300 of heating the dip-molded layer to cross-link the latex composition for dip molding.

The step S100 is a step of dipping a dip molding mold into a coagulant solution to attach a coagulant onto a surface of the dip molding mold so that the coagulant is formed on the dip molding mold. The coagulant solution is a solution obtained by dissolving a coagulant in water, alcohol, or a mixture thereof. A content of the coagulant in the coagulant solution may be 5 wt % to 45 wt % with respect to a total content of the coagulant solution.

The coagulant may be, for example, one or more selected from the group consisting of metal halide such as barium chloride, calcium chloride, magnesium chloride, zinc chloride, or aluminum chloride; nitrate such as barium nitrate, calcium nitrate, or zinc nitrate; acetate such as barium acetate, calcium acetate, or zinc acetate; and sulfate such as calcium sulfate, magnesium sulfate, or aluminum sulfate. As a specific example, the coagulant may be calcium chloride or calcium nitrate.

In addition, the step S200 may be a step of dipping the dip molding mold to which the coagulant is attached into the latex composition for dip molding according to the present invention and taking out the dip molding mold to form a dip-molded layer on the dip molding mold.

In addition, the step S300 may be a step of heating the dip-molded layer formed on the dip molding mold and cross-linking and curing the latex composition for dip molding to obtain a dip-molded article.

Thereafter, the dip-molded layer cross-linked by the heating treatment may be removed from the dip molding mold to obtain a dip-molded article.

According to an exemplary embodiment of the present invention, the molded article may be a glove such as a surgical glove, an examination glove, an industrial glove, or a household glove, a condom, a catheter, or a health care product.

Hereinafter, the present invention will be described in more detail by examples. However, the following examples are provided for illustrating the present invention. It is apparent to a person skilled in the art that various modifications and alterations may be made without departing from the scope and spirit of the present invention, and the scope of the present invention is not limited thereto.

EXAMPLES

Example 1

Preparation of Carboxylic Acid-Modified Nitrile-Based Copolymer Latex

Hereinafter, wt % indicates a total content of monomers to be added to form a main chain of a carboxylic acid-modified nitrile-based copolymer, and part(s) of weight indicates a total of 100 parts by weight of the monomers to be added.

23 wt % of acrylonitrile and 3.5 wt % of methacrylic acid were added to a polymerization reactor installed with a stirrer and stirring was started to mix them, 0.6 parts by weight of t-dodecylmercaptan, 4.0 parts by weight of sodium dodecylbenzene sulfonate, and 120 parts by weight of water at 70° C. were added, 73.5 wt % of 1,3-butadiene was added, and then, emulsion polymerization was initiated by adding 0.3 parts by weight of potassium persulfate as a polymerization initiator at a pressure of 2.5 kgf/cm$^2$ and a temperature of 40° C.

The reaction pressure at the time when the polymerization conversion rate was 40% was controlled to 2.68 kgf/cm$^2$, the reaction pressure at the time when the polymerization conversion rate was 60% was controlled to 3.55 kgf/cm$^2$, and the reaction pressure at the time when the polymerization conversion rate was 90% was controlled to 1.25 kgf/cm$^2$. When the polymerization conversion rate reached 94%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

Preparation of Latex Composition for Dip Molding

To 100 parts by weight (based on a solid content) of the obtained carboxylic acid-modified nitrile-based copolymer latex, 1 part by weight of sulfur, 1.0 part by weight of zinc di-n-butyldithiocarbamate (ZDBC), 1.3 parts by weight of zinc oxide, 1 part by weight of titanium oxide, an aqueous potassium hydroxide solution, and secondary distilled water were added to obtain a latex composition for dip molding having a solid content concentration of 30 wt % and a pH of 10.2.

Production of Molded Article 18 wt % of calcium nitrate, 81.5 wt % of water, and 0.5 wt % of a wetting agent (Teric 320, produced by Huntsman Corporation, Australia) were mixed with each other to prepare a coagulant solution. A hand-shaped ceramic mold was dipped into the solution for 13 seconds and taken out from the solution, and the hand-shaped ceramic mold was dried at 120° C. for 3 minutes, thereby applying a coagulant to the hand-shaped mold.

Subsequently, the hand-shaped mold to which the coagulant was applied was dipped into the obtained latex composition for dip molding for 13 seconds and taken out from the latex composition, the hand-shaped mold was dried at 80° C. for 1 minute, and the dried hand-shaped mold was dipped into water or warm water for 60 seconds. Thereafter, cross-linking was performed at 120° C. for 20 minutes. A cross-linked dip-molded layer was removed from the hand-shaped mold, thereby obtaining a molded article having a glove shape.

Example 2

21 wt % of acrylonitrile and 2.9 wt % of methacrylic acid were added to a polymerization reactor installed with a stirrer and stirring was started to mix them, 0.3 parts by weight of t-dodecylmercaptan, 3.0 parts by weight of sodium dodecylbenzene sulfonate, and 130 parts by weight of water at 60° C. were added, 76.1 wt % of 1,3-butadiene was added, and then, emulsion polymerization was initiated by adding 0.25 parts by weight of potassium persulfate as a polymerization initiator at a pressure of 2.6 kgf/cm$^2$ and a temperature of 40° C.

The reaction pressure at the time when the polymerization conversion rate was 40% was controlled to 2.78 kgf/cm$^2$, the reaction pressure at the time when the polymerization conversion rate was 60% was controlled to 3.95 kgf/cm$^2$, and the reaction pressure at the time when the polymerization conversion rate was 90% was controlled to 1.17 kgf/cm².

When the polymerization conversion rate reached 96%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Example 3

22 wt % of acrylonitrile and 3.9 wt % of methacrylic acid were added to a polymerization reactor installed with a stirrer and stirring was started to mix them, 0.8 parts by weight of t-dodecylmercaptan, 3.0 parts by weight of sodium dodecylbenzene sulfonate, and 110 parts by weight of water at 65° C. were added, 74.1 wt % of 1,3-butadiene was added, and then, emulsion polymerization was initiated by adding 0.35 parts by weight of potassium persulfate as a polymerization initiator at a pressure of 2.5 kgf/cm² and a temperature of 37° C.

The reaction pressure at the time when the polymerization conversion rate was 40% was controlled to 2.75 kgf/cm², the reaction pressure at the time when the polymerization conversion rate was 60% was controlled to 4.13 kgf/cm², and the reaction pressure at the time when the polymerization conversion rate was 90% was controlled to 0.25 kgf/cm².

When the polymerization conversion rate reached 94%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Example 4

23 wt % of acrylonitrile and 2.9 wt % of methacrylic acid were added to a polymerization reactor installed with a stirrer and stirring was started to mix them, 0.3 parts by weight of t-dodecylmercaptan, 2.5 parts by weight of sodium dodecylbenzene sulfonate, and 140 parts by weight of water at 45° C. were added, 74.1 wt % of 1,3-butadiene was added, and then, emulsion polymerization was initiated by adding 0.2 parts by weight of potassium persulfate as a polymerization initiator at a pressure of 2.6 kgf/cm² and a temperature of 40° C.

The reaction pressure at the time when the polymerization conversion rate was 40% was controlled to 2.86 kgf/cm², the reaction pressure at the time when the polymerization conversion rate was 60% was controlled to 3.38 kgf/cm², and the reaction pressure at the time when the polymerization conversion rate was 90% was controlled to 2.34 kgf/cm².

When the polymerization conversion rate reached 96%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Example 5

23 wt % of acrylonitrile and 3.5 wt % of methacrylic acid were added to a polymerization reactor installed with a stirrer and stirring was started to mix them, 0.6 parts by weight of t-dodecylmercaptan, 3.5 parts by weight of sodium dodecylbenzene sulfonate, and 110 parts by weight of water at 75° C. were added, 73.5 wt % of 1,3-butadiene was added, and then, emulsion polymerization was initiated by adding 0.3 parts by weight of potassium persulfate as a polymerization initiator at a pressure of 2.4 kgf/cm² and a temperature of 39° C.

The reaction pressure at the time when the polymerization conversion rate was 40% was controlled to 2.59 kgf/cm², the reaction pressure at the time when the polymerization conversion rate was 60% was controlled to 3.46 kgf/cm², and the reaction pressure at the time when the polymerization conversion rate was 90% was controlled to 1.2 kgf/cm².

When the polymerization conversion rate reached 95%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Example 6

23 wt % of acrylonitrile and 2.9 wt % of methacrylic acid were added to a polymerization reactor installed with a stirrer and stirring was started to mix them, 0.25 parts by weight of t-dodecylmercaptan, 3.0 parts by weight of sodium dodecylbenzene sulfonate, and 110 parts by weight of water at 60° C. were added, 74.1 wt % of 1,3-butadiene was added, and then, emulsion polymerization was initiated by adding 0.45 parts by weight of potassium persulfate as a polymerization initiator at a pressure of 2.0 kgf/cm² and a temperature of 36° C.

The reaction pressure at the time when the polymerization conversion rate was 40% was controlled to 2.1 kgf/cm², the reaction pressure at the time when the polymerization conversion rate was 60% was controlled to 2.6 kgf/cm², and the reaction pressure at the time when the polymerization conversion rate was 90% was controlled to 0.2 kgf/cm².

When the polymerization conversion rate reached 97%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Example 7

23 wt % of acrylonitrile and 3.5 wt % of methacrylic acid were added to a polymerization reactor installed with a stirrer and stirring was started to mix them, 0.5 parts by weight of t-dodecylmercaptan, 3.5 parts by weight of sodium dodecylbenzene sulfonate, and 120 parts by weight of water at 80° C. were added, 73.5 wt % of 1,3-butadiene was added, and then, emulsion polymerization was initiated by adding 0.15 parts by weight of potassium persulfate as a polymerization initiator at a pressure of 2.8 kgf/cm$^2$ and a temperature of 45° C.

The reaction pressure at the time when the polymerization conversion rate was 40% was controlled to 2.94 kgf/cm$^2$, the reaction pressure at the time when the polymerization conversion rate was 60% was controlled to 4.62 kgf/cm$^2$, and the reaction pressure at the time when the polymerization conversion rate was 90% was controlled to 0.14 kgf/cm$^2$.

When the polymerization conversion rate reached 94%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Example 8

21 wt % of acrylonitrile and 2.9 wt % of methacrylic acid were added to a polymerization reactor installed with a stirrer and stirring was started to mix them, 0.6 parts by weight of t-dodecylmercaptan, 3.5 parts by weight of sodium dodecylbenzene sulfonate, and 120 parts by weight of water at 70° C. were added, 76.1 wt % of isoprene was added, and then, emulsion polymerization was initiated by adding 0.3 parts by weight of potassium persulfate as a polymerization initiator at a pressure of 2.7 kgf/cm$^2$ and a temperature of 42° C.

The reaction pressure at the time when the polymerization conversion rate was 40% was controlled to 2.89 kgf/cm$^2$, the reaction pressure at the time when the polymerization conversion rate was 60% was controlled to 3.86 kgf/cm$^2$, and the reaction pressure at the time when the polymerization conversion rate was 90% was controlled to 1.49 kgf/cm$^2$.

When the polymerization conversion rate reached 94%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

COMPARATIVE EXAMPLES

Comparative Example 1

23 wt % of acrylonitrile and 3.5 wt % of methacrylic acid were added to a polymerization reactor installed with a stirrer and stirring was started to mix them, 0.25 parts by weight of t-dodecylmercaptan, 4.0 parts by weight of sodium dodecylbenzene sulfonate, and 140 parts by weight of water at 30° C. were added, 73.5 wt % of 1,3-butadiene was added, and then, emulsion polymerization was initiated by adding 0.45 parts by weight of potassium persulfate as a polymerization initiator at a pressure of 2.9 kgf/cm$^2$ and a temperature of 45° C.

The reaction pressure at the time when the polymerization conversion rate was 40% was controlled to 2.90 kgf/cm$^2$, the reaction pressure at the time when the polymerization conversion rate was 60% was controlled to 3.19 kgf/cm$^2$, and the reaction pressure at the time when the polymerization conversion rate was 90% was controlled to 3.07 kgf/cm$^2$.

When the polymerization conversion rate reached 97%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Comparative Example 2

21 wt % of acrylonitrile and 2.9 wt % of methacrylic acid were added to a polymerization reactor installed with a stirrer and stirring was started to mix them, 0.6 parts by weight of t-dodecylmercaptan, 4.0 parts by weight of sodium dodecylbenzene sulfonate, and 120 parts by weight of water at 95° C. were added, 76.1 wt % of 1,3-butadiene was added, and then, emulsion polymerization was initiated by adding 0.3 parts by weight of potassium persulfate as a polymerization initiator at a pressure of 3.4 kgf/cm$^2$ and a temperature of 44° C.

The reaction pressure at the time when the polymerization conversion rate was 40% was controlled to 4.01 kgf/cm$^2$, the reaction pressure at the time when the polymerization conversion rate was 60% was controlled to 5.85 kgf/cm$^2$, and the reaction pressure at the time when the polymerization conversion rate was 90% was controlled to 3.74 kgf/cm$^2$.

When the polymerization conversion rate reached 94%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Comparative Example 3

21 wt % of acrylonitrile and 2.9 wt % of methacrylic acid were added to a polymerization reactor installed with a stirrer and stirring was started to mix them, 0.25 parts by weight of t-dodecylmercaptan, 3.0 parts by weight of sodium dodecylbenzene sulfonate, and 110 parts by weight of water at 60° C. were added, 76.1 wt % of 1,3-butadiene was added, and then, emulsion polymerization was initiated by adding 0.45 parts by weight of potassium persulfate as a polymerization initiator at a pressure of 3.6 kgf/cm$^2$ and a temperature of 45° C.

The reaction pressure at the time when the polymerization conversion rate was 40% was controlled to 3.6 kgf/cm$^2$, the reaction pressure at the time when the polymerization conversion rate was 60% was controlled to 3.85 kgf/cm$^2$, and the reaction pressure at the time when the polymerization conversion rate was 90% was controlled to 3.82 kgf/cm$^2$.

When the polymerization conversion rate reached 97%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Comparative Example 4

23 wt % of acrylonitrile and 3.5 wt % of methacrylic acid were added to a polymerization reactor installed with a stirrer and stirring was started to mix them, 0.6 parts by weight of t-dodecylmercaptan, 3.5 parts by weight of sodium dodecylbenzene sulfonate, and 110 parts by weight of water at 75° C. were added, 73.5 wt % of 1,3-butadiene was added, and then, emulsion polymerization was initiated by adding 0.3 parts by weight of potassium persulfate as a polymerization initiator at a pressure of 2.4 kgf/cm$^2$ and a temperature of 39° C.

The reaction pressure at the time when the polymerization conversion rate was 40% was controlled to 2.69 kgf/cm$^2$, the reaction pressure at the time when the polymerization conversion rate was 60% was controlled to 4.03 kgf/cm$^2$, and the reaction pressure at the time when the polymerization conversion rate was 90% was controlled to 2.64 kgf/cm$^2$.

When the polymerization conversion rate reached 95%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Comparative Example 5

23 wt % of acrylonitrile and 2.9 wt % of methacrylic acid were added to a polymerization reactor installed with a stirrer and stirring was started to mix them, 0.3 parts by weight of t-dodecylmercaptan, 2.5 parts by weight of sodium dodecylbenzene sulfonate, and 140 parts by weight of water at 91° C. were added, 74.1 wt % of 1,3-butadiene was added, and then, emulsion polymerization was initiated by adding 0.2 parts by weight of potassium persulfate as a polymerization initiator at a pressure of 2.6 kgf/cm$^2$ and a temperature of 40° C.

The reaction pressure at the time when the polymerization conversion rate was 40% was controlled to 2.86 kgf/cm$^2$, the reaction pressure at the time when the polymerization conversion rate was 60% was controlled to 3.38 kgf/cm$^2$, and the reaction pressure at the time when the polymerization conversion rate was 90% was controlled to 2.34 kgf/cm$^2$.

When the polymerization conversion rate reached 96%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

Comparative Example 6

23 wt % of acrylonitrile and 3.5 wt % of methacrylic acid were added to a polymerization reactor installed with a stirrer and stirring was started to mix them, 0.5 parts by weight of t-dodecylmercaptan, 3.5 parts by weight of sodium dodecylbenzene sulfonate, and 120 parts by weight of water at 39° C. were added, 73.5 wt % of 1,3-butadiene was added, and then, emulsion polymerization was initiated by adding 0.15 parts by weight of potassium persulfate as a polymerization initiator at a pressure of 2.8 kgf/cm$^2$ and a temperature of 45° C.

The reaction pressure at the time when the polymerization conversion rate was 40% was controlled to 2.94 kgf/cm$^2$, the reaction pressure at the time when the polymerization conversion rate was 60% was controlled to 4.62 kgf/cm$^2$, and the reaction pressure at the time when the polymerization conversion rate was 90% was controlled to 0.14 kgf/cm$^2$.

When the polymerization conversion rate reached 94%, the polymerization was terminated. Thereafter, unreacted products were removed through a deodorization process, and ammonium water, an antioxidant, and a defoaming agent were added, thereby obtaining a carboxylic acid-modified nitrile-based copolymer latex.

A latex composition for dip molding and a molded article were produced by using the obtained carboxylic acid-modified nitrile-based copolymer latex in the same manner as that of Example 1.

EXPERIMENTAL EXAMPLES

Experimental Example 1

Physical properties of the carboxylic acid-modified nitrile-based copolymer latex prepared in each of Examples and Comparative Examples were measured by the following method. The results are shown in Table 1.

(1) $CV_0$ (mm$^2$/s): A pH of each carboxylic acid-modified nitrile-based copolymer latex having a solid content of 44% to 47% was adjusted to 8.8 to 9.1 using 10% ammonium water, and then, the carboxylic acid-modified nitrile-based copolymer latex was dissolved in methyl ethyl ketone (MEK) at a concentration of 2.55 wt % to be dispersed well. Thereafter, 10 ml of the carboxylic acid-modified nitrile-based copolymer latex was added to a Cannon-Fenske routine type capillary viscometer (SI Analytics GmbH Type No. 520 13), the time for the copolymer latex to pass through a capillary at 25° C. was measured, and a viscosity was calculated using the following Equation 2.

$$CV_0 = K \times t \qquad \text{[Equation 2]}$$

In Equation 2, K is a constant (mm$^2$/s$^2$) of the capillary, and t is a time (s) for the copolymer latex to pass through the capillary.

(2) $CV_D$ (mm$^2$/s), P: A pH of each carboxylic acid-modified nitrile-based copolymer latex having a solid content of 44% to 47% was adjusted to 8.8 to 9.1 using 10% ammonium water, and then, the carboxylic acid-modified nitrile-based copolymer latex was dissolved in methyl ethyl ketone (MEK) at a concentration of 2.55 wt % to be dispersed well. Thereafter, de-swelling was performed by applying an energy of 55 kcal to 65 kcal using the ultrasonicator (Bransonic® M Mechanical Bath 5800) for 40 minutes, 10 ml of the carboxylic acid-modified nitrile-based copolymer latex was added to the Cannon-Fenske routine type capillary viscometer (SI Analytics GmbH Type No. 520 13), the time for the copolymer latex to pass through the capillary at 25° C. was measured, and a viscosity ($CV_D$) was calculated using Equation 2. P was measured by dividing the calculated $CV_D$ by $CV_0$ ($P=CV_D/CV_0$).

(3) M: A pH of each carboxylic acid-modified nitrile-based copolymer latex having a solid content of 44% to 47% was adjusted to 8.8 to 9.1 using 10% ammonium water, and the copolymer latex was applied onto a substrate using a cast method or the like, drying was performed at 130° C. to 140° C. for 40 minutes to obtain a dried film, and a weight ($f_1$) of the dried film was measured. Subsequently, the dried film was dipped into methyl ethyl ketone at 25° C. for 48 hours, a weight ($f_2$) of the dipped film was measured, and drying was performed at 170° C. for 30 minutes to remove the methyl ethyl ketone. Then, a weight ($f_3$) of the film after removing the methyl ethyl ketone was measured. An insolubility ($m_1$) and a swelling index ($m_2$) of the film in the methyl ethyl ketone solvent were measured from the measurement results of these weights according to the following Equations 3 and 4, and M was measured according to Equation 5.

Insolubility in methyl ethyl ketone solvent($m_1$)=$f_3/f_1$  [Equation 3]

Swelling index in methyl ethyl ketone solvent($m_2$)= ($f_2-f_3$)/$f_3$  [Equation 4]

$M=m_1 \times m_2$  [Equation 5]

Figure 2:
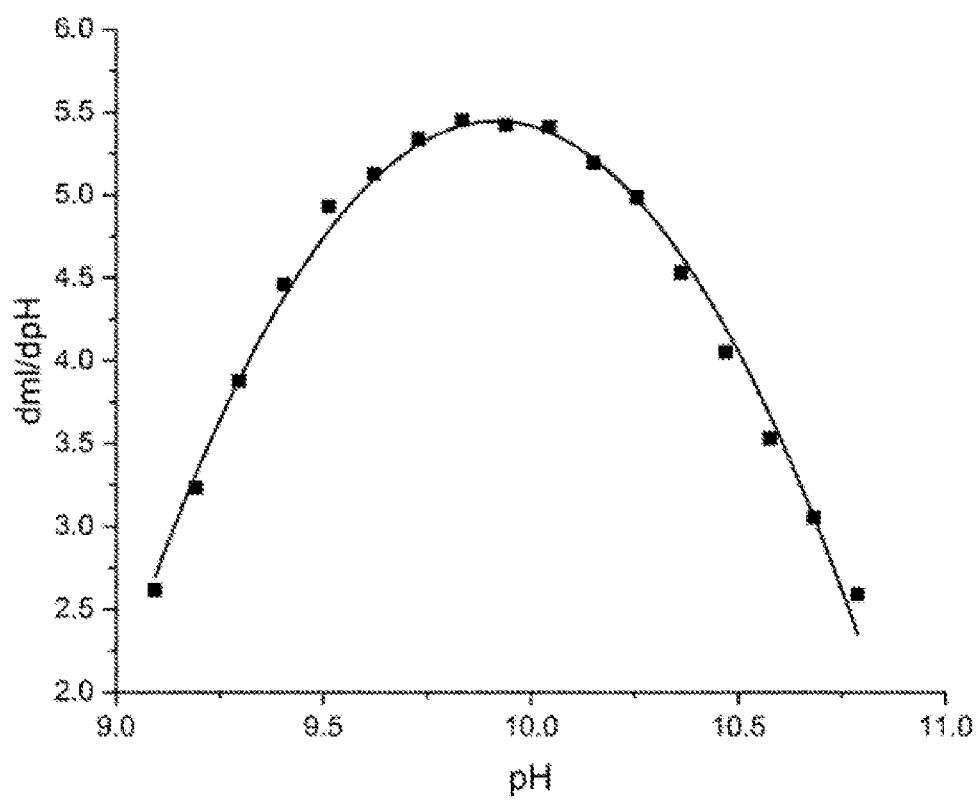
FIG. 2 is a derivative curve of the addition amount of KOH according to the pH.

(4) pKa: The carboxylic acid-modified nitrile-based copolymer latex according to Example 1 was diluted using deionized water to a solid content of 10%, a pH thereof was increased to 12 using a 1.25% aqueous potassium hydroxide solution, and stirring was performed at 50° C. for 2 hours to remove ammonia in the aqueous solution. The obtained diluted solution was cooled to room temperature, a pH of the solution was decreased to 2 or less using a 1% diluted aqueous hydrochloric acid solution, and the solution was stirred at a temperature of 50° C. for 2 hours. Next, carbon dioxide in the aqueous solution was removed, the obtained diluted solution was cooled to room temperature, and an acid-base titration graph was obtained using an aqueous potassium hydroxide solution having a concentration of exactly 3%. The results are shown in Tables 1 and 2. FIG. 1 is a graph showing a change in pH according to an addition amount of KOH. The amount of carboxylic acid calculated by the addition amount of KOH between the first inflection point and the second inflection point in FIG. 1 is the amount of acid present on a surface. FIG. 2 is a derivative curve of the addition amount of KOH according to the pH. The vertex of the quadratic function is a pKa of the carboxylic acid-modified nitrile-based copolymer latex. In addition, a pKa of the remaining carboxylic acid-modified nitrile-based copolymer latex according to each of Examples and Comparative Examples was confirmed in the same manner.

TABLE 1

| | $CV_0$ (mm²/s) | $CV_D$ (mm²/s) | P | M | pKa |
|---|---|---|---|---|---|
| Example 1 | 2.13 | 1.96 | 0.92 | 10.7 | 9.93 |
| Example 2 | 1.65 | 1.57 | 0.95 | 9.51 | 9.97 |
| Example 3 | 1.99 | 1.95 | 0.98 | 12.09 | 9.76 |
| Example 4 | 2.01 | 1.85 | 0.92 | 7.8 | 10.14 |
| Example 5 | 2.13 | 2.00 | 0.94 | 12.43 | 9.71 |
| Example 6 | 2.01 | 1.81 | 0.9 | 9.51 | 9.97 |
| Example 7 | 2.13 | 2.04 | 0.96 | 13.01 | 9.65 |
| Example 8 | 1.65 | 1.53 | 0.93 | 10.66 | 9.85 |
| Comparative Example 1 | 2.13 | 1.66 | 0.78 | 4.13 | 10.68 |
| Comparative Example 2 | 1.65 | 1.39 | 0.84 | 20.98 | 9.11 |
| Comparative Example 3 | 1.65 | 1.27 | 0.77 | 9.51 | 9.97 |
| Comparative Example 4 | 2.13 | 1.73 | 0.81 | 12.43 | 9.71 |
| Comparative Example 5 | 2.01 | 1.85 | 0.92 | 21.12 | 9.08 |
| Comparative Example 6 | 2.13 | 2.04 | 0.96 | 4.78 | 10.59 |

Referring to Table 1, it could be confirmed that in the case of Examples 1 to 8, physical properties of the latex itself were improved through optimization of the structure of the latex particles by adjusting the entanglement degree or the branch degree and the acid distribution of the copolymer in the latex particles in the polymerization step by controlling process factors for the carboxylic acid-modified nitrile-based copolymer latex according to the present invention, and thus, the value of P was in a range of 0.85 to 1, the value of pKa was 9.5 to 10.2, and the value of M was 5 to 20.

On the other hand, in the case of Comparative Examples 1 to 6, the structure of the latex particles was not optimized as in the present invention, and thus, the physical properties of the latex were not improved.

Experimental Example 2

Workability when producing the molded article and physical properties of the molded article produced in each of Examples and Comparative Examples were measured by the following method. The results are shown in Table 2.

(1) Stress retention rate (%): A dumbbel-shaped specimen was prepared from the molded article according to the ASTM D-412 method, the specimen was pulled at a cross-head speed of 300 mm/min using a measurement device (U. T. M.) (3345 model, Instron) until elongation calculated according to the following Equation 6 reached 100%, a stress reduction for 5 minutes was measured, and a stress retention rate was calculated according to the following Equation 7.

Elongation(%)=(length after specimen elongation/ initial length of specimen)×100  [Equation 6]

Stress retention rate (%)=(load value 5 minutes after specimen elongation/initial load value of specimen elongation)×100  [Equation 7]

(2) Flow mark: A degree of formation of a flow mark on an appearance of the molded article produced in each of Examples and Comparative Examples was visually observed. The results are represented by a 10-point method (10: 0 or flow mark is formed in the dip-molded article with an area of 100 cm², 9: 2 or 3 flow marks are formed in the dip-molded article with an area of 100 cm², 8: 4 or 5 flow marks are formed in the dip-molded article with an area of 100 cm², 7: 6 or 7 flow marks are formed in the dip-molded article with an area of 100 cm², 6: 8 or 9 flow marks are formed in the dip-molded article with an area of 100 cm², 5: 10 or 11 flow marks are formed in the dip-molded article with an area of 100 cm², 4: 12 flow marks are formed in the dip-molded article with an area of 100 cm², 3: 13 flow marks are formed in the dip-molded article with an area of 100 cm², 2: 14 flow marks are formed in the dip-molded article with an area of 100 cm², and 1: 15 or more flow marks are formed in the dip-molded article with an area of 100 cm²).

(3) Polymerization stability (10-point method): Each carboxylic acid-modified nitrile-based copolymer latex was prepared, the latex was filtered with a mesh having a pore size of about 50 micrometers, and then, drying was performed at a temperature of 170° C. for 30 minutes, thereby obtaining a coagulation. Then, a weight of the coagulation filtered with the mesh with respect to a weight of a pure solid content was repeatedly calculated three times in terms of a ppm unit, and an average value thereof was calculated. The results are represented by a 10-point method (10: 100 ppm or less, 9: more than 100 ppm and 200 ppm or less, 8: more than 200 ppm and less than 300 ppm, 7: more than 300 ppm and less than 400 ppm, 6: more than 400 ppm and less than 500 ppm, 5: more than 500 ppm and less than 600 ppm, 4: more than 600 ppm and less than 700 ppm, 3: more than 700 ppm and less than 800 ppm, 2: more than 800 ppm and less than 900 ppm, 1: more than 900 ppm and less than 1,000 ppm, and 0: more than 1,000 ppm).

TABLE 2

| | Stress retention rate (%) | Flow mark (10-point method) | Polymerization stability (10-point method) |
|---|---|---|---|
| Example 1 | 46.9 | 8 | 9 |
| Example 2 | 48.7 | 7 | 8 |
| Example 3 | 51.3 | 8 | 8 |
| Example 4 | 46.1 | 7 | 6 |
| Example 5 | 47.8 | 9 | 7 |
| Example 6 | 44.3 | 8 | 6 |
| Example 7 | 49.5 | 8 | 9 |
| Example 8 | 46.9 | 7 | 8 |
| Comparative Example 1 | 33.9 | 2 | 2 |
| Comparative Example 2 | 39.1 | 4 | 3 |
| Comparative Example 3 | 33.1 | 7 | 6 |
| Comparative Example 4 | 36.5 | 7 | 7 |
| Comparative Example 5 | 46.1 | 2 | 1 |
| Comparative Example 6 | 49.6 | 3 | 2 |

Referring to Table 2, it could be appreciated that in the case of Examples 1 to 8, in the carboxylic acid-modified nitrile-based copolymer latex according to the present invention, the polymerization stability was improved, and in the molded article formed of the latex composition for dip molding comprising the carboxylic acid-modified nitrile-based copolymer latex according to the present invention, the elasticity was improved due to the high stress retention rate, and the workability when producing a glove was also improved due to prevention of the formation of the flow mark during dip molding.

On the other hand, in the case of Comparative Examples 1 to 6, in the unimproved carboxylic acid-modified nitrile-based copolymer latex unlike in the present invention, the stability during polymerization was deteriorated, and in the molded article formed of the latex composition for dip molding comprising the same, the stress retention rate was remarkably deteriorated as compared to those in Examples. In addition, the workability when producing the molded article was deteriorated. Therefore, the flow mark formed in the dip-molded article was increased.

The invention claimed is:

1. A carboxylic acid-modified nitrile-based copolymer latex comprising a carboxylic acid-modified nitrile-based copolymer including a conjugated diene-based monomer-derived unit, an ethylenic unsaturated nitrile-based monomer-derived unit, and an ethylenic unsaturated acid monomer-derived unit, wherein a pKa of the carboxylic acid-modified nitrile-based copolymer latex is 9.5 to 10.2, and the carboxylic acid-modified nitrile-based copolymer latex satisfies the following General Formula 1 and General Formula 2:

$$0.85 \leq P \leq 1.0, P = CV_D/CV_0 \quad \text{[General Formula 1]}$$

$$5 \leq M \leq 20, M = m_1 \times m_2 \quad \text{[General Formula 2]}$$

in General Formula 1, $CV_0$ represents a capillary viscosity of the carboxylic acid-modified nitrile-based copolymer latex measured in a swollen state in a methyl ethyl ketone solvent, and $CV_D$ represents a capillary viscosity of the carboxylic acid-modified nitrile-based copolymer latex in a de-swollen state, and in General Formula 2, $m_1$ represents an insolubility of a dried film of the carboxylic acid-modified nitrile-based copolymer latex in the methyl ethyl ketone solvent, and $m_2$ represents a swelling index of the dried film of the carboxylic acid-modified nitrile-based copolymer latex in the methyl ethyl ketone solvent.

2. The carboxylic acid-modified nitrile-based copolymer latex of claim 1, wherein a conjugated diene-based monomer of the conjugated diene-based monomer unit includes one or more of 1,3-butadiene, 2,3-dimethyl-1,3-butadiene, 2-ethyl-1,3-butadiene, 1,3-pentadiene, or isoprene.

3. The carboxylic acid-modified nitrile-based copolymer latex of claim 1, wherein an ethylenic unsaturated nitrile-based monomer of the ethylenic unsaturated nitrile-based monomer-derived unit includes one or more of acrylonitrile, methacrylonitrile, fumaronitrile, α-chloronitrile, or α-cyanoethylacrylonitrile.

4. The carboxylic acid-modified nitrile-based copolymer latex of claim 1, wherein an ethylenic unsaturated acid monomer of the ethylenic unsaturated acid monomer-derived unit includes one or more of acrylic acid, methacrylic acid, itaconic acid, maleic acid, fumaric acid, maleic acid anhydride, citraconic acid anhydride, styrenesulfonic acid, monobutyl fumarate, monobutyl maleate, or mono-2-hydroxypropyl maleate.

5. The carboxylic acid-modified nitrile-based copolymer latex of claim 1, wherein a conjugated diene-based monomer of the conjugated diene-based monomer-derived unit is 1,3-butadiene or isoprene, an ethylenic unsaturated nitrile-based monomer of the ethylenic unsaturated nitrile-based monomer-derived unit is acrylonitrile, and an ethylenic unsaturated acid monomer of the ethylenic unsaturated acid monomer-derived unit is methacrylic acid.

6. The carboxylic acid-modified nitrile-based copolymer latex of claim 1, wherein the carboxylic acid-modified nitrile-based copolymer further includes an ethylenic unsaturated monomer-derived unit.

7. The carboxylic acid-modified nitrile-based copolymer latex of claim 1, wherein the carboxylic acid-modified nitrile-based copolymer includes 15 wt % to 30 wt % of the ethylenic unsaturated nitrile-based monomer-derived unit, 1.5 wt % to 5.5 wt % of the ethylenic unsaturated acid monomer-derived unit, and 64.5 wt % to 83.5 wt % of the conjugated diene-based monomer-derived unit.

8. The carboxylic acid-modified nitrile-based copolymer latex of claim 1, wherein $CV_0$ is 0.5 to 4.

9. The carboxylic acid-modified nitrile-based copolymer latex of claim 1, wherein P is 0.9 to 1.

10. The carboxylic acid-modified nitrile-based copolymer latex of claim 1, wherein M is 7 to 15.

* * * * *